(12) United States Patent
Chen et al.

(10) Patent No.: US 10,550,996 B1
(45) Date of Patent: Feb. 4, 2020

(54) ADJUSTABLE SCREEN LIFT ARM

(71) Applicant: CHEN-SOURCE INC., Taoyuan (TW)

(72) Inventors: Yuan-Chen Chen, Taoyuan (TW);
Chien-Chiang Huang, Taoyuan (TW);
Hsin-Hung Chen, Taoyuan (TW)

(73) Assignee: CHEN-SOURCE INC., Guishan District, Taoyuan (TW)

( * ) Notice: Subject to any disclaimer, the term of this patent is extended or adjusted under 35 U.S.C. 154(b) by 0 days.

(21) Appl. No.: 16/048,758

(22) Filed: Jul. 30, 2018

(51) Int. Cl.
*F16M 13/02* (2006.01)
*F16H 19/04* (2006.01)

(52) U.S. Cl.
CPC ............ *F16M 13/022* (2013.01); *F16H 19/04* (2013.01); *F16H 2019/046* (2013.01); *F16M 2200/047* (2013.01)

(58) Field of Classification Search
USPC ....... 248/123.11, 123.2, 125.1, 125.2, 125.8, 248/132, 161, 162.1, 157, 917, 919; 361/679.21
See application file for complete search history.

(56) References Cited

U.S. PATENT DOCUMENTS

| | | | | |
|---|---|---|---|---|
| 6,119,605 A * | 9/2000 | Agee | ................ | A47B 9/02 108/147 |
| 7,621,490 B2 * | 11/2009 | Tseng | ................ | F16M 11/046 248/157 |
| 7,789,354 B2 * | 9/2010 | Gan | ................ | F16M 11/14 248/121 |
| 7,793,898 B2 * | 9/2010 | Dong | ................ | F16M 11/105 248/157 |
| 7,854,417 B2 * | 12/2010 | Gan | ................ | F16M 11/24 248/122.1 |
| 8,033,513 B2 * | 10/2011 | Jang | ................ | F16M 11/046 248/122.1 |
| 2006/0237618 A1 * | 10/2006 | Chiang | ................ | F16M 11/046 248/404 |
| 2007/0145203 A1 * | 6/2007 | Takada | ................ | F16M 11/10 248/162.1 |
| 2009/0179133 A1 * | 7/2009 | Gan | ................ | F16M 11/105 248/422 |

\* cited by examiner

*Primary Examiner* — Alfred J Wujciak
(74) *Attorney, Agent, or Firm* — Muncy, Geissler, Olds & Lowe, P.C.

(57) ABSTRACT

An adjustable screen lift arm includes a support frame assembly with a frame base, a balance adjustment mechanism including a gear set consisting a drive gear and a sector-like driven gear, a gear rack meshed with the drive gear and a spring connected between the frame base and the driven gear, and a holder block assembly has a holder block body that combined with the gear rack and a first sliding rail, the other side combined with a second sliding rail. When the holder block body is moved vertically, the gear rack rotates the drive gear, causing the driven gear to stretch or compress the spring so that the arm of force is relatively changed to offset the spring force of the spring, enabling the holder block assembly to be freely adjusted to the desired elevation and then automatically positioned.

12 Claims, 9 Drawing Sheets

ADJUSTABLE SCREEN LIFT ARM

BACKGROUND OF THE INVENTION

1. Field of the Invention

The present invention relates to display screen support technology and more particularly, to an adjustable screen lift arm, which comprises a support frame assembly, a balance adjustment mechanism and a holder block assembly. When a holder block body of the holder block assembly is moved vertically by an external force, a gear rack of the balance adjustment mechanism is driven to rotate a drive gear of a gear set, causing rotation of a driven gear to stretch or compress a spring. During rotation of the driven gear, the length of the arm of force is relatively changed to offset the elastic restoring energy of the spring, enabling the holder block assembly to be freely adjusted to the desired elevation and then automatically positioned in the adjusted position.

2. Description of the Related Art

Monitors and TV display screens are popularly used in today's home life, offices, schools and workstations are very popular. Due to the drawbacks of being bulky with poor quality and capable of receiving analog signal only, the early cathode ray tube type display screens have been eliminated by the market. Nowadays, LCD or plasma-type display screens have been widely used to replace conventional cathode ray tube type designs for the advantages of having light, thin, clear picture characteristics and being capable of receiving analog and digital signals. However, commercial display screen stands simply allow view angle adjustment with a small range. During display screen view angle adjustment, the user must pay attention to the location of the center of gravity of the display screen to avoid dumping. A display screen can be mounted in a wall or at a high place. However, commercial wall mount type display screen support designs do not allow easy adjustment of the view angle of the supported display screen, limiting the application.

In order to meet the user's need to adjust display screen angular position and to minimize desktop or workstation installation space, angle-adjustable adjustable screen lift arms are created. These conventional angle-adjustable adjustable screen lift arms can be installed on a desktop, pylons or wall by clamp means or hanging means. Further, these conventional angle-adjustable adjustable screen lift arms have a number of swivel arms coupled to one another, facilitating the user to adjust the display screen view angle or elevation. However, users often have the need to operate the keyboard and mouse in practical applications, and the screen and keyboard mouse rack can be directly integrated on the lift arm or swivel arm of the support frame so that the user can watch the screen and operate the keyboard and the mouse in a standing or sitting position. However, because the height between the screen and the keyboard mouse rack set on the support frame is large and not adjustable, for users with taller heights or shorter heights, there will be a slight inconvenience when watching the screen and operating the keyboard and the mouse.

Even if there is a lift arm on the support frame that allows adjustment of the height between the screen and the keyboard mouse rack, the lift arm needs the assistance of a tool or a screw lock to adjust the height of the screen. This will make it difficult for the user to adjust the screen. The stroke of lifting displacement is also difficult to apply to users of different heights, resulting in improper posture of the user's body or limbs, and less suitable for ergonomic design. When the screen is installed on the lift arm of the support frame, due to the different weight of the load, if the supporting force of the lift arm is not exactly adjusted and locked, the support frame can fall due to a heavy load, even causing structural destruction of the screen. An improvement in this regard is necessary.

SUMMARY OF THE INVENTION

The present invention has been accomplished under the circumstances in view. It is the main object of the present invention to provide an adjustable screen lift arm, which comprises the support frame assembly, the balance adjustment mechanism and the holder block assembly. The support frame assembly comprises a frame base and an outer cover. The frame base defines an accommodation chamber and a front opening in communication with the accommodation chamber. The outer cover is fastened to the frame base over the front opening, defining an upper opening in communication with the front opening and the accommodation chamber. The balance adjustment mechanism is mounted in the accommodation chamber of the frame base, comprising the gear set, the gear rack and the spring. The gear set comprises the drive gear and the driven gear made in the form of a sector and meshed with the drive gear. The gear rack is meshed with the drive gear. The spring is connected between the frame base and the driven gear. The holder block assembly comprises the holder block body, a first sliding rail and a second sliding rail respectively mounted to two opposite lateral sides of the frame base, a connection plate affixed to a back side of the holder block body and inserted through the upper opening of the outer cover into the inside of the frame base with one lateral side thereof connected to the gear rack and the first sliding rail and an opposite lateral side thereof connected to the second sliding rail. When the holder block body of the holder block assembly is moved vertically by an external force, the gear rack is driven to rotate the drive gear of the gear set, causing rotation of the driven gear to stretch or compress the spring. During rotation of the driven gear, the length of the arm of force is relatively changed to offset the elastic restoring energy of the spring, enabling the holder block assembly to be freely adjusted to the desired elevation and then automatically positioned in the adjusted position.

According to another aspect of the present invention, the driven gear of the drive gear is a sector gear. When the holder block assembly is moved downward to bias the driven gear to the end, the border edge of the driven gear has no tooth for engagement with the drive gear, and the action to stretch or compress the spring is stopped, avoiding elastic fatigue of the spring due to an overpressure from the downward movement of the holder block assembly and preventing the screen from losing automatic positioning, and thus, the overall service life of the adjustable screen lift arm can be prolonged.

According to still another aspect of the present invention, the gear set of the balance adjustment mechanism directly utilizes the rotation of the driven gear to stretch or compress the spring without any extra auxiliary devices, minimizing the use of components and reducing the manufacturing cost.

According to still another aspect of the present invention, the user can fasten tight or loosen an adjustment screw of the balance adjustment mechanism to move a stop member in stretching or compressing the spring when going to adjust the torque according to the load, thus, a tension adjustment unit can adjust the torque of the gear set according to the load of the screen, controlling displacement smoothness of the screen.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
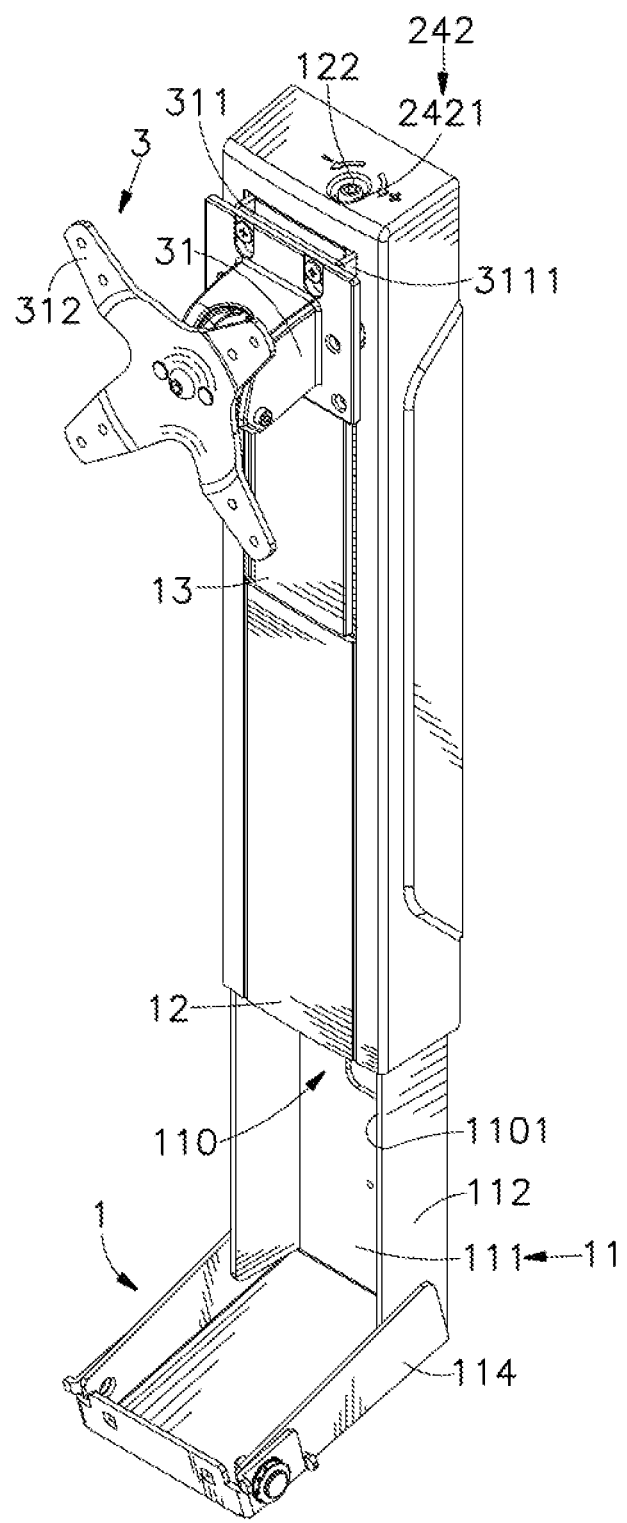
FIG. 1 is an oblique top elevational view of an adjustable screen lift arm in accordance with the present invention.
Figure 2:
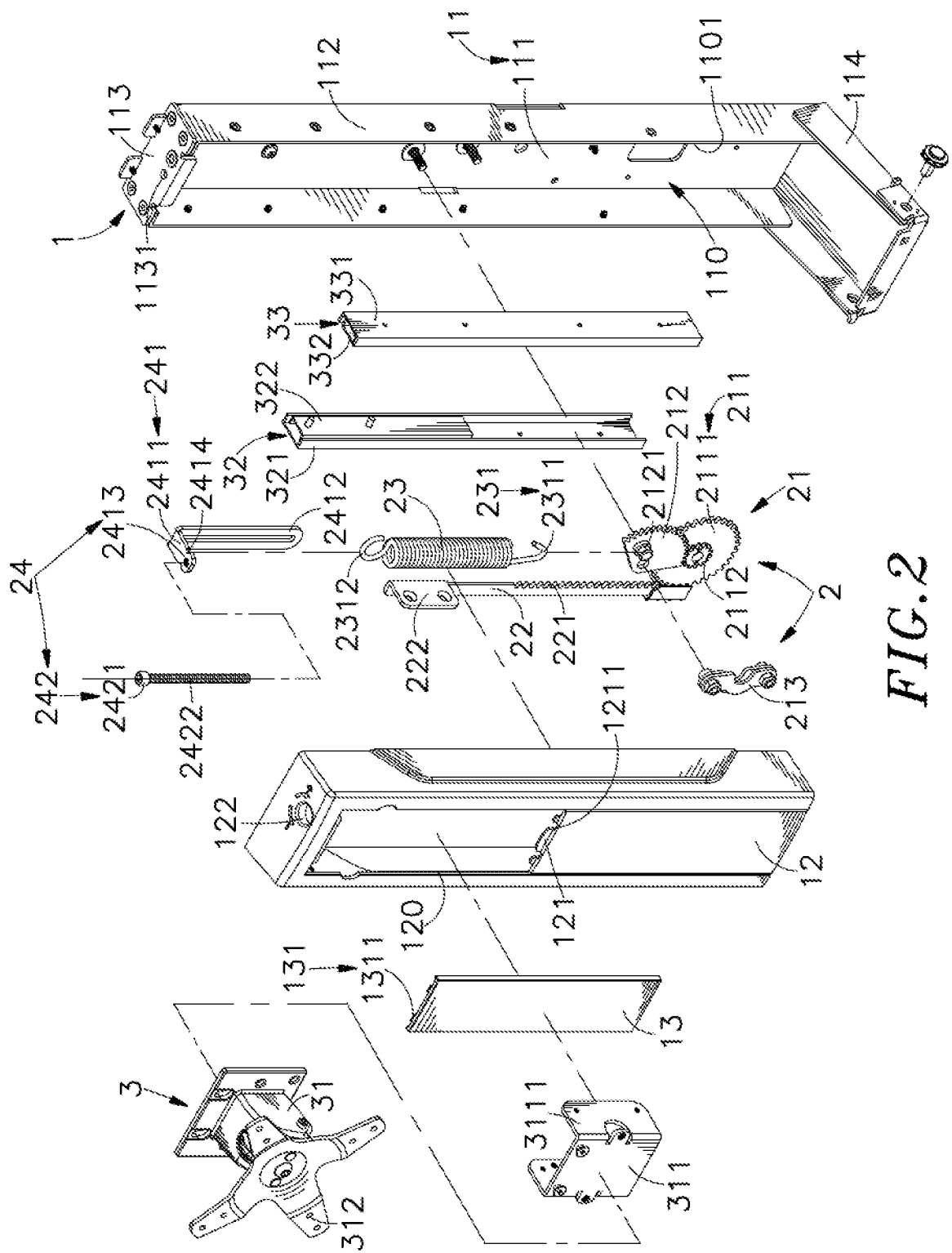
FIG. 2 is an exploded view of the adjustable screen lift arm in accordance with the present invention.
Figure 3:
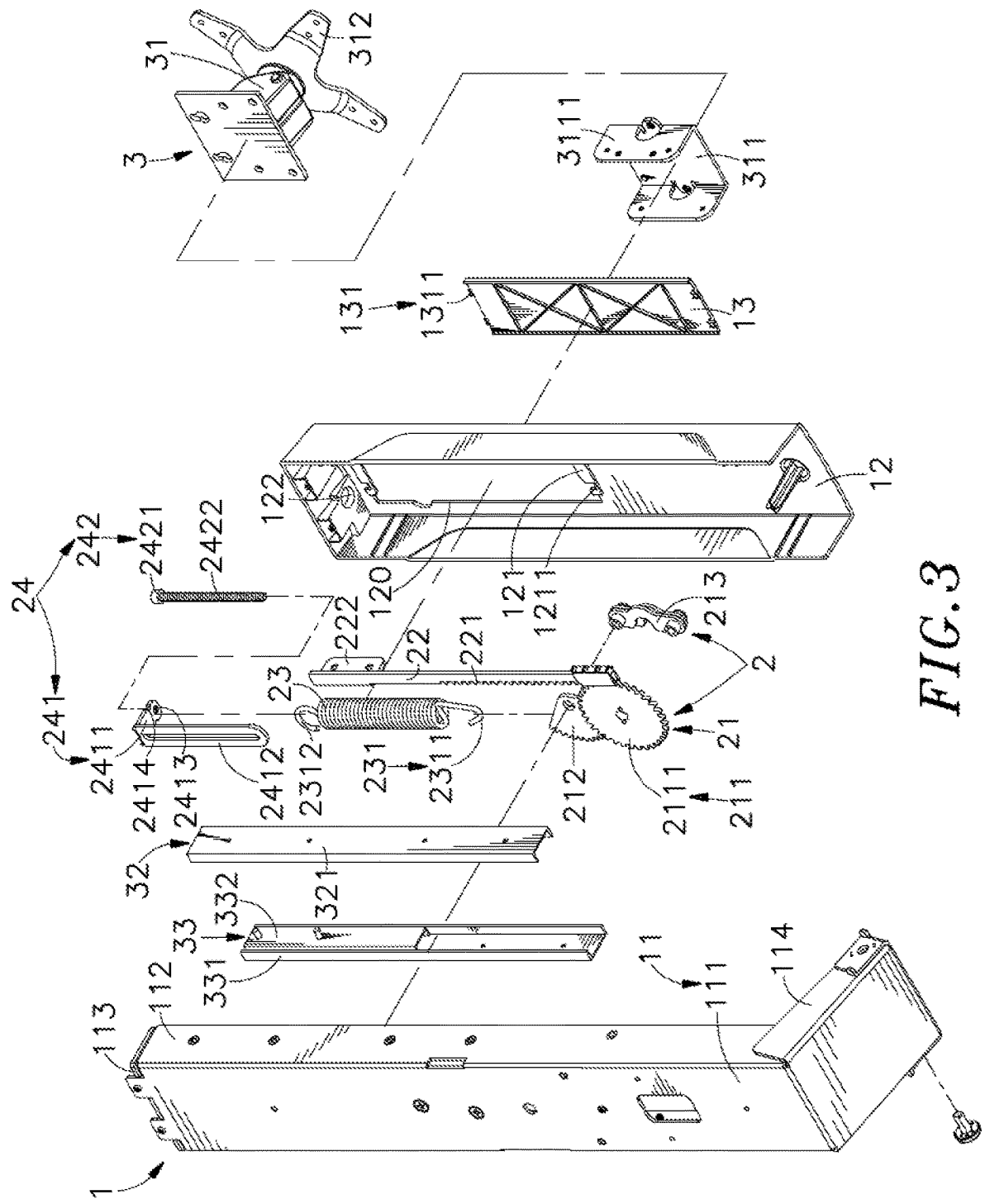
FIG. 3 corresponds to FIG. 2 when viewed from another angle.
Figure 4:
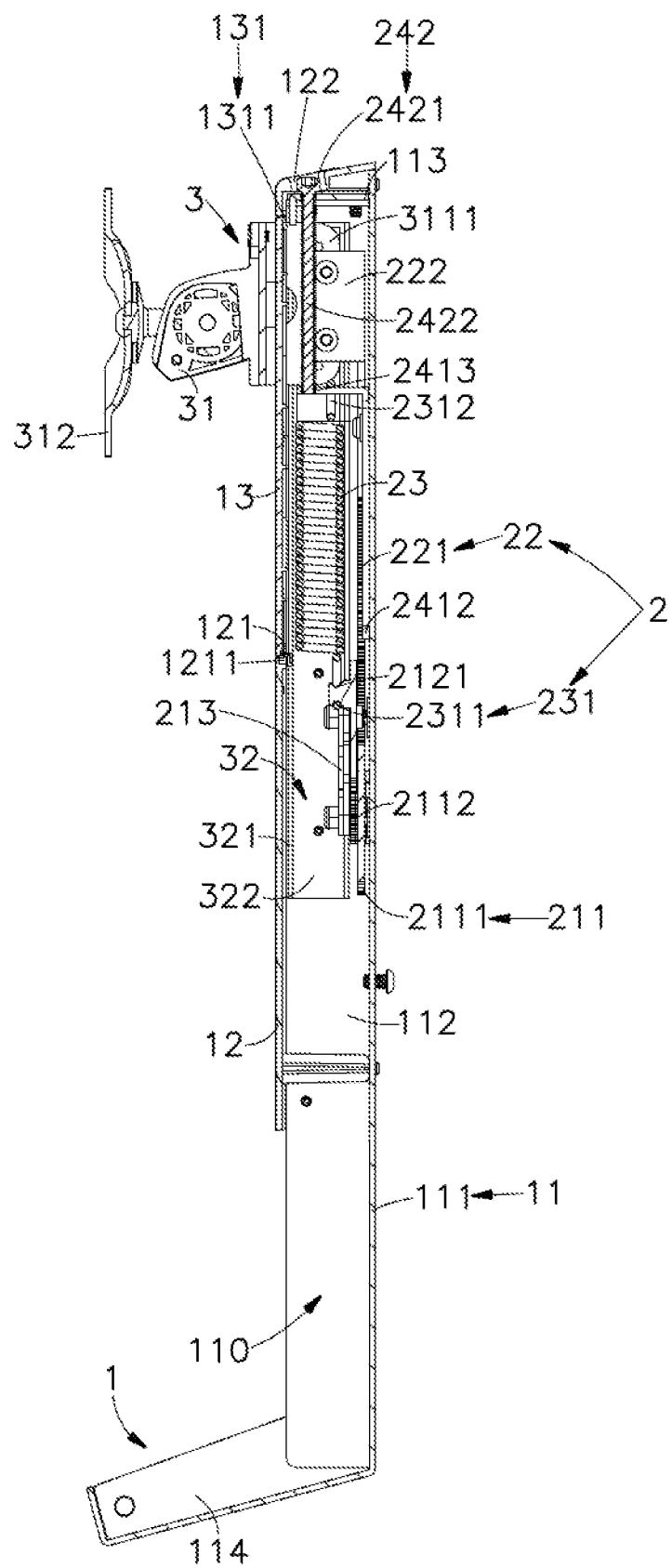
FIG. 4 is a sectional side view of the adjustable screen lift arm in accordance with the present invention.
Figure 5:
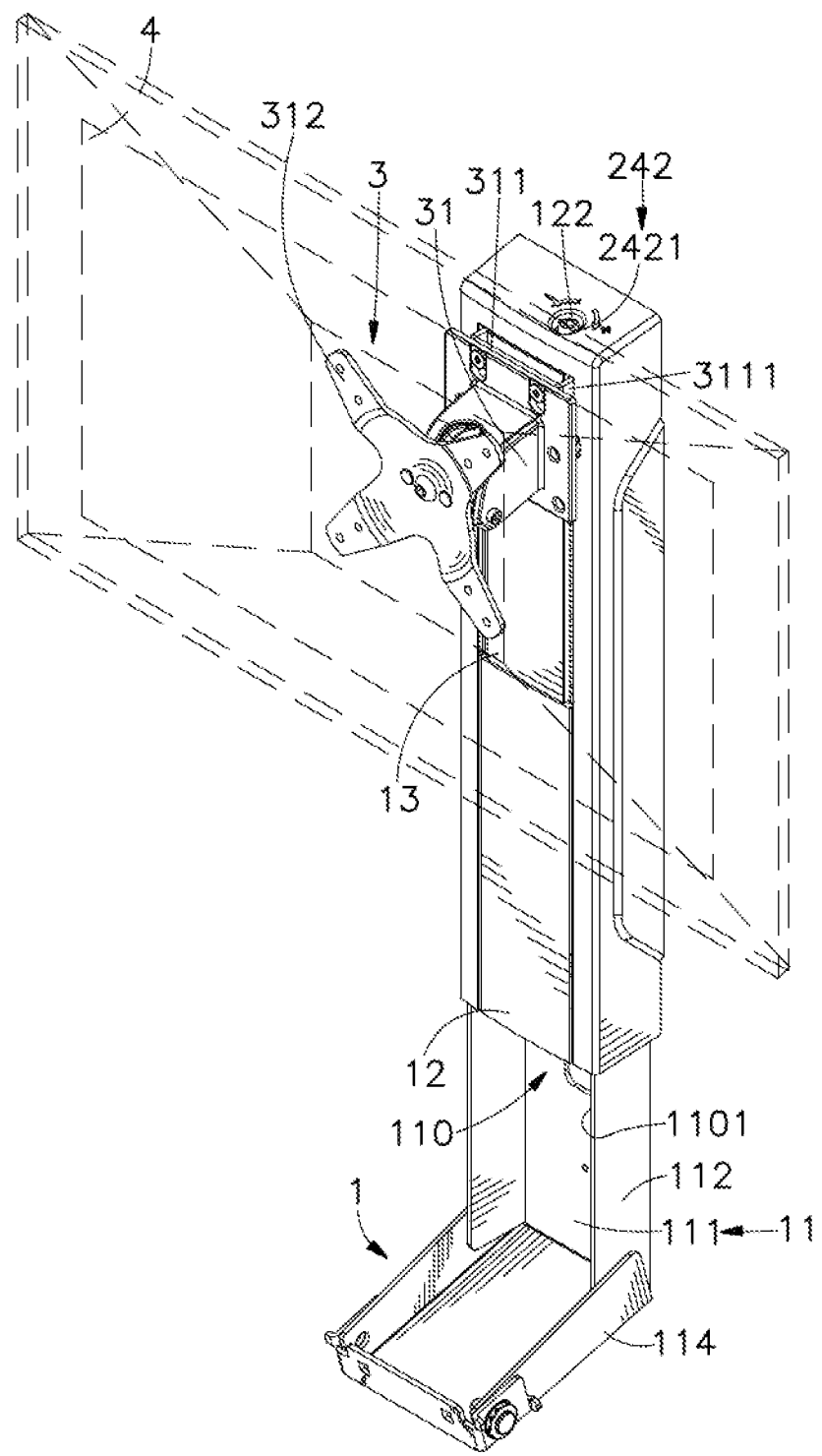
FIG. 5 is a schematic applied view of the present invention.
Figure 6:
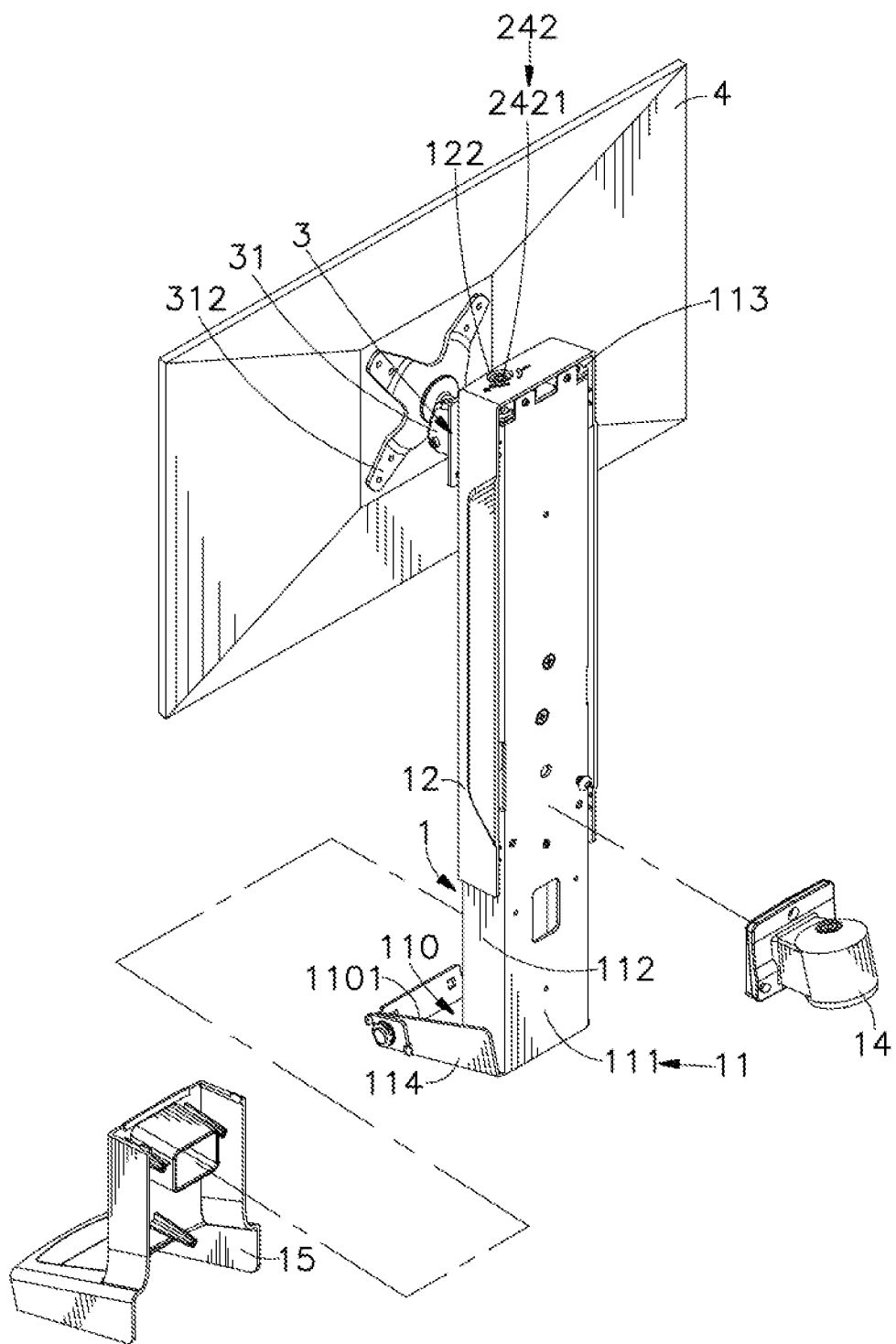
FIG. 6 is an exploded view, illustrating a use of the adjustable screen lift arm with a mounting adapter and a tabletop bracket.

Referring to FIGS. 1-4, an adjustable screen lift arm in accordance with the present invention is shown. The adjustable screen lift arm comprises a support frame assembly 1, a balance adjustment mechanism 2 and a holder block assembly 3.

The support frame assembly 1 comprises a frame base 11, an outer cover 12 and a front panel 13. The frame base 11 comprises a back panel 111, two opposing side panels 112 respectively and perpendicularly extended from opposing left and right sides of the back panel 111, and opposing top panel 113 and a bottom panel 114 respectively and perpendicularly extended from opposing top and bottom sides of the back panel 111, an accommodation chamber 110 with a front opening 1101 surrounded by the back panel 111, the side panels 112, the top panel 113 and the bottom panel 114, and a penetrate hole 1131 vertically cut through the top panel 113 near the front opening 1101. The front panel 13 comprises male retaining means 131 consisting of a plurality of retaining lugs 1311 and located on opposing top and bottom sides thereof.

The outer cover 12 is fastened to the frame base 11 to cover the front opening 1101 of the accommodation chamber 110, comprising an upper opening 120 cut through an upper half thereof and disposed in communication with the front opening 1101 and the accommodation chamber 110, female retaining means 121 consisting of a plurality of retaining holes 1211 and disposed in opposing top and bottom edges of the upper opening 120, a through hole 122 located on a top side thereof and disposed in alignment with the penetrate hole 1131 of the top panel 113 of the frame base 11. By means of forcing the retaining lugs 1311 of the male retaining means 131 of the front panel 13 into engagement with the respective retaining holes 1211 of the female retaining means 121, the front panel 13 is fastened to the upper opening 120 of the outer cover 12.

The balance adjustment mechanism 2 is mounted in the accommodation chamber 110 of the frame base 11, comprising a gear set 21, a gear rack 22 and a spring 23. The gear set 21 comprises a drive gear 211 pivotally connected to the back panel 111, a driven gear 212 pivotally connected to the back panel 111 above the drive gear 211 and meshed with the drive gear 211, and a positioning plate 213 positioned between the surface of the center axis of the drive gear 211 and the surface of the center axis of the driven gear 212. The drive gear 211 is a stepped gear comprising a main gear 2111 and an auxiliary gear 2112 stacked on the main gear 2111 and meshed with the driven gear 212. The gear radius of the auxiliary gear 2112 is smaller than the main gear 2111. The driven gear 212 of the gear set 21 is a sector gear, comprising a locating rod 2121 disposed near a top edge thereof for the fastening of one end of the spring 23. The gear rack 22 is disposed in vertical, comprising a toothed portion 221 longitudinally extended along one side thereof and meshed with the main gear 2111 of the drive gear 211 of the gear set 21, and a mounting plate 222 perpendicularly extended from a top end thereof toward the accommodation chamber 110 of the frame base 11 and disposed in parallel to the side panels 112. By means of controlling the gear ratio between the meshed gears of the gear set 21, the rotating direction and speed of the gear set 21 is relatively changed. When the gear rack 22 is driven to rotate the gear set 21, the torque can be amplified according to a predetermined gear ratio, and the gear set 21 can be controlled to perform the action of extending or retracting the spring 23.

The spring 23 is mounted between the top panel 113 of the frame base 11 and the driven gear 212, having two opposite end portions 231 respectively made in the form of a hook 2311 or a hook ring 2312. The hook 2311 of a bottom-sided end portion 231 of the spring 23 is directly hooked on the locating rod 2121 of the driven gear 212. The hook ring 2312 of the top-sided end portion 231 of the spring 23 is directly or indirectly fastened to an inner side of the frame base 11.

The balance adjustment mechanism 2 further comprises a tension adjustment unit 24 for controlling the tension of the spring 23. The tension adjustment unit 24 comprises a stop member 241 disposed between the frame base 11 and the spring 23, and an adjustment screw 242 threaded into the stop member 241. The stop member 241 comprises a short top plate 2411 horizontally disposed at a top side, a long bottom plate 2412 vertically downwardly extended from the short top plate 2411 at right angles, a screw hole 2413 located on the short top plate 2411, and a notch 2414 located on each of two opposite lateral sides of the short top plate 2411, The hook ring 2312 of the top-sided end portion 231 of the spring 23 is hung on the notches 2414 of the short top plate 2411. The adjustment screw 242 comprises a screw head 2421 and a screw shank 2422 extended from one side of the screw head 2421. The screw head 2421 is disposed outside the through hole 122 of the outer cover 12 and stopped outside the penetrate hole 1131 of the top panel 113. The screw shank 2422 is downwardly inserted through the penetrate hole 1131 of the top panel 113 and then threaded into the of the short top plate 2411 to suspend in the spring 23.

The holder block assembly 3 comprises a holder block body 31, a first sliding rail 32 and a second sliding rail 33 respectively mounted to the two side panels 112 of the frame base 11, a U-shaped connection plate 311 affixed to a back side of the holder block body 31 and having two opposing side wings 3111 thereof respectively inserted through the upper opening 120 of the outer cover 12 over two opposite lateral sides of the front panel 13 into the accommodation chamber 110 of the frame base 11, and a locating plate 312 connected to an opposing front side of the holder block body 31 for supporting a display screen. Preferably, the holder block body 31 and the locating plate 312 are connected together by a ball-and-socket joint. The first sliding rail 32 comprises a first fixed rail member 321, and a first movable rail member 322 coupled to and movable along the first fixed rail member 321. The second sliding rail 33 comprises a second fixed rail member 331, and a second movable rail member 332 coupled to and movable along the second fixed rail member 331. The first fixed rail member 321 and the second fixed rail member 331 are respectively affixed to the two side panels 112 of the frame base 11. One side wing 3111 of the connection plate 311 is affixed to the mounting plate 222 of the gear rack 22 and the first movable rail member 322 of the first sliding rail 32. The other side wing 3111 is affixed to the second movable rail member 332 of the second sliding rail 33.

Referring to FIGS. 5-9, the holder block body 31 and the connection plate 311 of the holder block assembly 3 in this embodiment are two separated members that are affixed together with screws. Alternatively, the connection plate 311 and the holder block body 31 can be integrally made in one piece.

The adjustable screen lift arm of the present invention is adapted for supporting a screen 4 that can be a desktop screen, industrial screen, a commercial screen, an interactive screen, a cantilever medical screen, or a workstation screen. In installation, the holder block body 31 of the holder block assembly 3 is fastened to the back side of the screen 4 using the locating plate 312 (see FIG. 7). By means of the ball-and-socket joint between the holder block body 31 and the locating plate 312, the screen 4 can be pitched up and down, rotated on a fixed point or turned leftward and rightward to adjust the angular position relative to the holder block body 31 of the holder block assembly 3. Further, a mounting adapter 14 is affixed to a back side of the back panel 111 of the frame base 11 of the support frame assembly 1 for securing the support frame assembly 1 to a wall, a stand, a support arm or a lift torsion arm. The support arm or lift torsion arm can be fastened to a tabletop with clamp means. The bottom panel 114 of the frame base 11 can be provided with a tabletop bracket 15 for fastening to a tabletop or platform. The tabletop bracket 15 can be configured to provide a keyboard mouse rack for supporting a keyboard and a mouse for operation by the user in a standing or sitting position.

When the user wishes to adjust the elevation of the screen 4, use the two hands to move the screen 4 upward or downward, causing the holder block body 31 of the holder block assembly 3 to move the gear rack 22 of the balance adjustment mechanism 2 and the first movable rail member 322 of the first sliding rail 32 upwardly or downwardly along the first fixed rail member 321 and also to move the second movable rail member 332 of the second sliding rail 33 upwardly or downwardly along the second fixed rail member 331. At this time, the toothed portion 221 of the gear rack 22 drives the main gear 2111 of the drive gear 211 of the gear set 21 to rotate, causing the auxiliary gear 2112 of the drive gear 211 to rotate the driven gear 212 clockwise or counter-clockwise. During rotation of the driven gear 212, the locating rod 2121 of the driven gear 212 is forced to stretch or compress the spring 23, causing movement of the two end portions 231 of the spring 23 in direction away from or toward each other.

Figure 7:
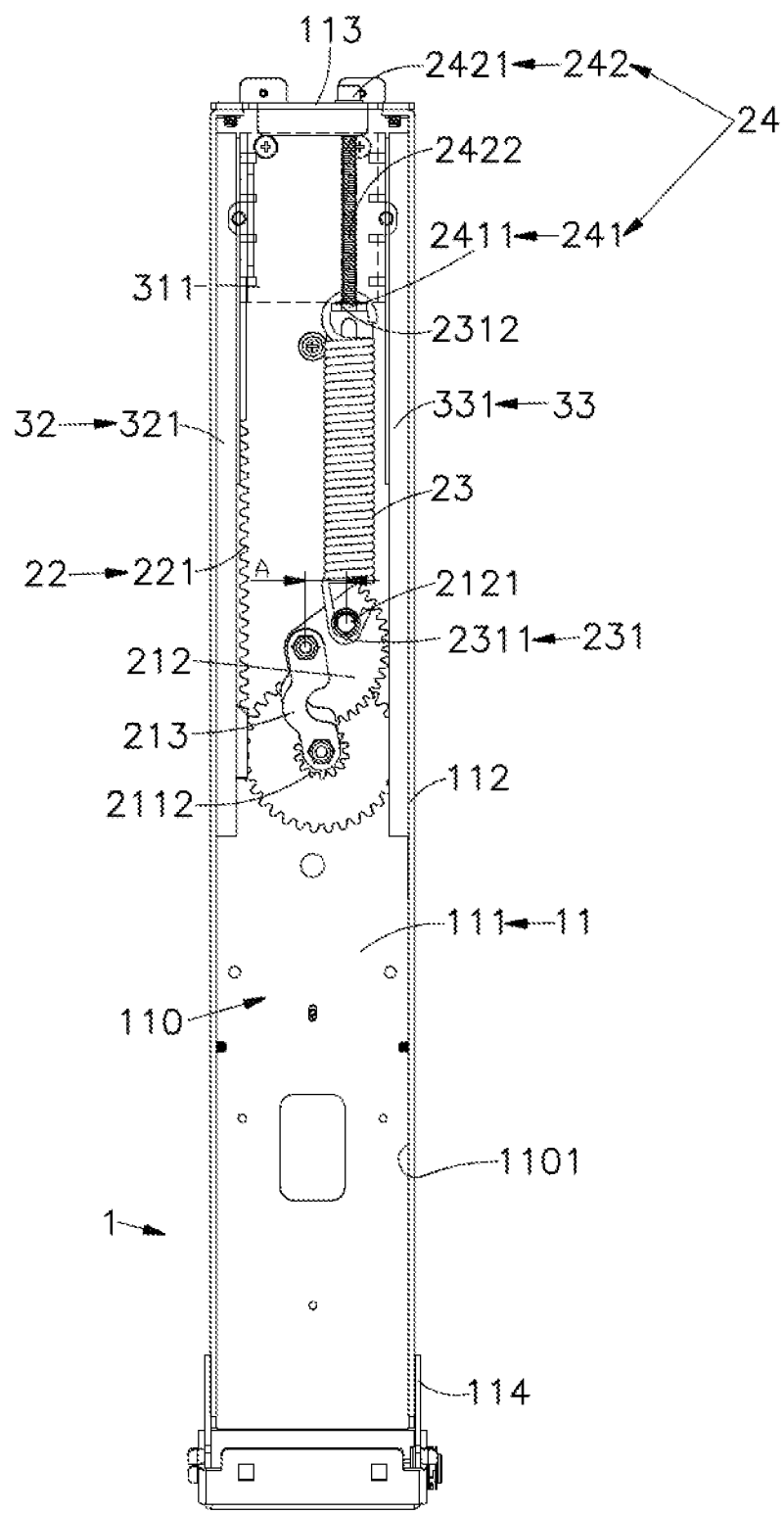
FIG. 7 is a front sectional view of the adjustable screen lift arm in accordance with the present invention.
Figure 8:
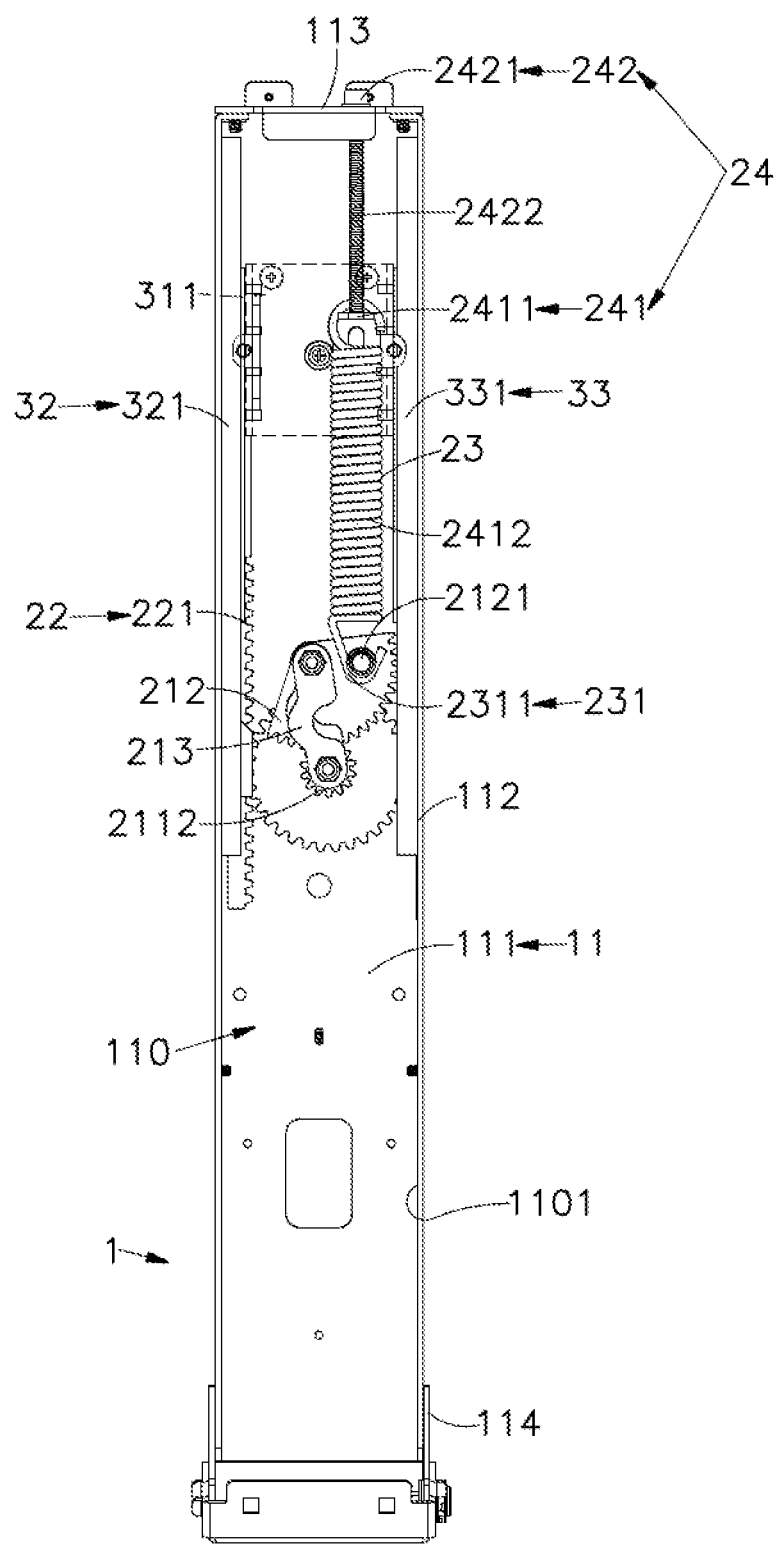
FIG. 8 is similar to FIG. 7, illustrating an adjustment of the balance adjustment mechanism.
Figure 9:
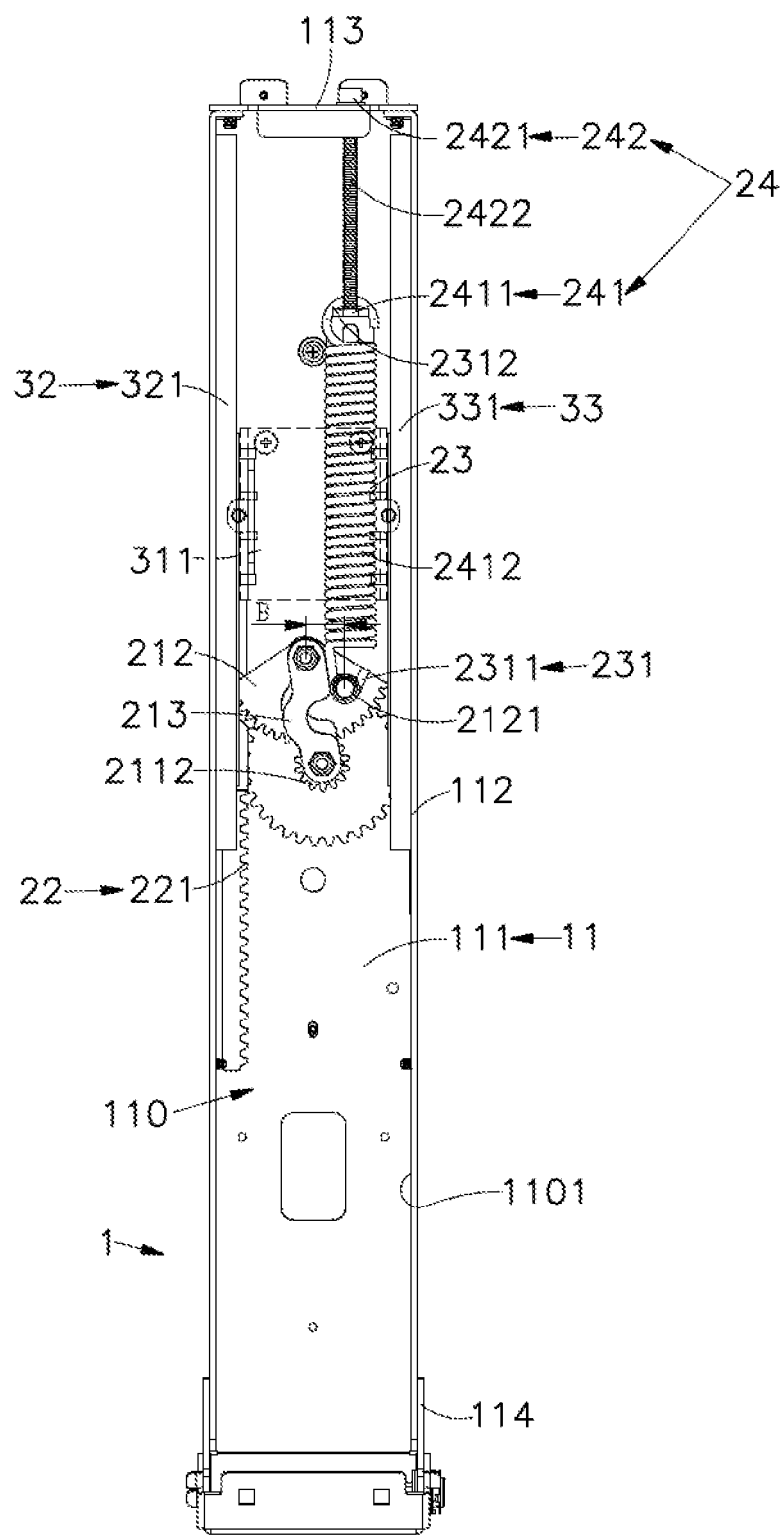
FIG. 9 is similar to FIG. 8, illustrating the status of the adjustable screen lift arm after adjustment of the balance adjustment mechanism.

During clockwise or counter-clockwise rotation of the driven gear 212, the arm of force between the center axis of the driven gear 212 and the locating rod 2121 is relatively changed (see FIGS. 7 and 9). The arm of force is "A" before clockwise rotation of the driven gear 212; the arm of force becomes "B" after the driven gear 212 is rotated clockwise. When the spring 23 is stretched (extended out), the length of the arm of force "B" is smaller than the arm of force "A"; when the spring 23 is compressed, the length of the arm of force "A" is larger than the arm of force "B". Further, if the spring 23 is extended out downwardly or compressed, it means the load becomes greater or smaller. Therefore, with a heavier load and a shorter arm of force "B", a lighter load will cooperate with a longer arm of force "A", so that the overall torque can be made uniform to offset the downwardly stretched elastic restoring energy of the spring 23. Thus, the elevation of the screen 4 can be freely adjusted and maintained in balance in the adjusted elevational position without a tool or the assistance of a screw lock. This screen elevational adjustment procedure is quite simple with less effort.

Further, when the user wishes to adjust the tension adjustment unit 24 of the balance adjustment mechanism 2 according to the load of the screen 4, the users can use the fingers or a tool to rotate the screw head 2421 of the adjustment screw 242 outside the through hole 122 of the outer cover 12 in the clockwise direction to tighten the adjustment screw 242 or the counter-clockwise direction to loosen the adjustment screw 242, driving the screw shank 2422 of adjustment screw 242 inwardly or outwardly relative to the screw hole 2413 of the stop member 241, and thus, the stop member 241 is caused to move vertically upward or downward to adjust the tension of the spring 23 (for example, when moving the stop member 241 downward, the spring 23 is shortened to reduce the tension; when moving the stop member 241 upward, the spring 23 is extended out to increase the tension). Subject to the tension of the spring 23, the torque of the gear set 21 is relatively changed. Thus, the tension adjustment unit 24 can be operated to adjust the tension of the spring 23 according to the weight of the screen 4. If the load of the screen 4 is a relatively heavy, fasten tight the adjustment screw 242. On the contrary, if the load of the screen 4 is relatively light, loosen the adjustment screw 242. By means of the tension adjustment unit 24 to properly adjust the torque of the gear set 21, the smoothness of the displacement of the screen 4 can be controlled.

The invention has the advantages as follows:

1. When the holder block assembly 3 is moved vertically, the gear rack 22 of the balance adjustment mechanism 2 is driven to rotate the drive gear 211 of the gear set 21, causing rotation of the driven gear 212 of the drive gear 211 in the clockwise or counter-clockwise direction to stretch or compress the spring 23; during rotation of the driven gear 212 of the gear set 21, the length of the arm of force is relatively changed to offset the elastic restoring energy of the spring 23, and thus, the holder block assembly 3 can be freely adjusted with less effort to the desired elevation and then automatically positioned in the adjusted elevational position.

2. The driven gear 212 of the drive gear 211 is a sector gear; when the holder block assembly 3 is moved downward to bias the driven gear 212 to the end, the border edge of the driven gear 212 has no tooth for engagement with the drive gear 211, and the action to stretch or compress the spring 23 is stopped, avoiding elastic fatigue of the spring 23 due to an overpressure from the downward movement of the holder block assembly 3 and preventing the screen 4 from losing automatic positioning, and thus, the overall service life of the adjustable screen lift arm can be prolonged.

3. The gear set 21 of the balance adjustment mechanism 2 directly utilizes the rotation of the driven gear 212 to stretch or compress the spring 23 without any extra auxiliary devices, minimizing the use of components and reducing the manufacturing cost.

4. When the user is going to adjust the torque according to the load, fasten tight or loosen the adjustment screw 242 of the balance adjustment mechanism 2 to move the stop member 241 in stretching or compressing the spring 23, thus, the tension adjustment unit 24 can adjust the torque of the gear set 21 according to the load of the screen 4, controlling displacement smoothness of the screen 4.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable screen lift arm, comprising:
a support frame assembly comprising a frame base and an outer cover, said frame base defining an accommodation chamber and a front opening in communication with said accommodation chamber, said outer cover being fastened to said frame base over said front opening, said outer cover defining an upper opening in communication with said front opening and said accommodation chamber;
a balance adjustment mechanism mounted in said accommodation chamber of said frame base, comprising a gear set, a gear rack and a spring, said gear set comprising a drive gear and a driven gear made in the form of a sector and meshed with said drive gear, said gear rack being meshed with said drive gear, said spring being connected between said frame base and said driven gear; and
a holder block assembly comprising a holder block body, a first sliding rail and a second sliding rail respectively mounted to two opposite lateral sides inside of said frame base, a connection plate affixed to a back side of said holder block body and inserted through said upper opening of said outer cover into the inside of said frame base with one lateral side thereof connected to said gear rack and said first sliding rail and an opposite lateral side thereof connected to said second sliding rail;
wherein when said holder block body of said holder block assembly is moved vertically by an external force, said gear rack is driven to rotate said drive gear of said gear set, causing rotation of said driven gear to stretch or compress said spring; during rotation of said driven gear, the length of an arm of force is relatively changed to offset the elastic restoring energy of said spring, enabling said holder block assembly to be freely adjusted to the desired elevation and then automatically positioned in the adjusted position.

2. The adjustable screen lift arm as claimed in claim 1, wherein said frame base of said support frame assembly comprises a back panel, two opposite side panels respectively perpendicularly extended from two opposite lateral sides of said back panel, a top panel and a bottom panel respectively extended from opposing top and bottom sides of said back panel; said accommodation chamber is surrounded by said back panel, said side panels, said top panel and said bottom panel; said support frame assembly further comprises a front panel fastened to said upper opening of said outer cover; said connection plate comprises two opposite side wings respectively inserted through said upper opening of said outer cover over two opposite lateral sides of said front panel into said accommodation chamber of said frame base with one said side wing connected to said gear rack and said first sliding rail and the other said side wing connected to said second sliding rail.

3. The adjustable screen lift arm as claimed in claim 2, wherein said outer cover comprises female retaining means consisting of a plurality of retaining holes and disposed in opposing top and bottom edges of said upper opening; said front panel comprises male retaining means consisting of a plurality of retaining lugs and located on opposing top and bottom sides thereof, said retaining lugs of said front panel being detachably fastened to respective said retaining holes of said outer cover.

4. The adjustable screen lift arm as claimed in claim 1, wherein said gear set further comprises a positioning plate connected between the surface of the center axis of said drive gear and the surface of the center axis of said driven gear.

5. The adjustable screen lift arm as claimed in claim 1, wherein said driven gear of said gear set comprises a locating rod disposed near a top edge thereof for the fastening of one end of said spring.

6. The adjustable screen lift arm as claimed in claim 1, wherein said frame base of said support frame assembly comprises said back panel and two opposite side panels; said drive gear and said driven gear of said gear set are respectively pivotally mounted on said back panel; said gear rack comprises a toothed portion longitudinally disposed at one side thereof and meshed with said drive gear.

7. The adjustable screen lift arm as claimed in claim 6, wherein said drive gear of said gear set comprises a main gear meshed with said toothed portion of said gear rack, and an auxiliary gear coaxially stacked on said main gear and meshed with said driven gear, the gear radius of said auxiliary gear is smaller than said main gear.

8. The adjustable screen lift arm as claimed in claim 6, wherein said gear rack comprises a mounting plate disposed at one end of said toothed portion in parallel to said side panels of said frame base; said first sliding rail comprises a first fixed rail member affixed to one said side panel of said frame base and a first movable rail member coupled to and movable along said first fixed rail member; said second sliding rail comprises a second fixed rail member affixed to the other said side panel of said frame base and a second movable rail member coupled to and movable along said second fixed rail member; said connection plate has one lateral side thereof affixed to said mounting plate of said gear rack and first movable rail member of said first sliding rail and an opposite lateral side thereof affixed to said second movable rail member of said second sliding rail.

9. The adjustable screen lift arm as claimed in claim 1, wherein said balance adjustment mechanism comprises a tension adjustment unit, said tension adjustment unit comprising a stop member disposed between said frame base and said spring and an adjustment screw threaded into said stop member and rotatable to move said stop member upward or downward; said spring is connected between said stop member and said driven gear of said gear set so that rotating said adjustment screw clockwise or counter-clockwise drives said stop member to move in stretching or compressing said spring, causing change of the torque of said gear set subject to the tension of said spring.

10. The adjustable screen lift arm as claimed in claim 9, wherein said stop member of said tension adjustment unit comprises a transversely extended short top plate, a long bottom plate vertically downwardly extended from said short top plate and a screw hole located on said short top plate for receiving said adjustment screw; said spring has a top end portion thereof fastened to said short top plate.

11. The adjustable screen lift arm as claimed in claim 9, wherein said frame base comprises said back panel, said top panel located at a top side of said back panel and a penetrate hole cut through said top panel; said outer cover comprises a through hole disposed in axial alignment with the said through hole of said frame base; said adjustment screw of said tension adjustment unit comprises a screw head stopped outside the said through hole of said outer cover and a screw shank extended from said screw head and inserted through the said through hole of said outer cover and the said through hole of said frame base and threaded into said screw hole of said short top plate of said stop member.

12. The adjustable screen lift arm as claimed in claim 1, wherein said holder block assembly further comprises a locating plate mounted to a front side of said holder block body for supporting a screen.

* * * * *